Nov. 26, 1963

D. R. FALKENBERG 3,112,103

ADJUSTING MEANS FOR HOLDDOWNS FOR PULLEYS
OF DRAPERY OPERATING CARDS

Filed Aug. 18, 1959

INVENTOR
DOUGLASS R. FALKENBERG

BY George W. Saywell
ATTORNEY

Nov. 26, 1963  D. R. FALKENBERG  3,112,103
ADJUSTING MEANS FOR HOLDDOWNS FOR PULLEYS
OF DRAPERY OPERATING CARDS
Filed Aug. 18, 1959  2 Sheets-Sheet 2

INVENTOR
DOUGLASS R. FALKENBERG

BY George W. Saywell
ATTORNEY

United States Patent Office 3,112,103
Patented Nov. 26, 1963

3,112,103
ADJUSTING MEANS FOR HOLDDOWNS FOR PULLEYS OF DRAPERY OPERATING CORDS
Douglass R. Falkenberg, 20997 Westlake Road, Rocky River, Ohio
Filed Aug. 18, 1959, Ser. No. 834,462
4 Claims. (Cl. 267—71)

The invention relates to adjusting means for holddowns for pulleys around the latter of which the operating cords for traverse rods of adjustable drapes are trained. An adjustment of these pulleys to desired operating position, obtained when spring tension thereon is temporarily manually overcome, serves under normal spring tension to hold them in the desired operating position.

The operative positioning means of the holddown includes means for pivotal securing the lower end of the holddown to a building wall, or a base moulding, or other lower supporting structural means.

The instant invention is particularly characterized by a separate clutch washer which is angularly rotatable in a pulldown housing element with an axially-movable pulley-mounting rod by force applied to the rod to overcome slip clutch washer-holding means. The clutch washer is formed with a cross slot through which the pulley-mounting rod passes, which cross slot permits axial movements of the pulley-mounting rod, but the body of the clutch washer prevents angular movements of the rod relative to the washer. The washer and, hence, the rod are held at spaced turned positions, herein shown as 90 degrees spacing, by the slip clutch means which act on the washer when it and the rod have been turned 90 degrees from the previously held position.

Various other improved structural features of the invention presented herein will be apparent from the following description and the accompanying drawings, all of which improved features will be described hereinafter in detail.

The annexed drawings and the following description set forth the principle of the said improvements in adjusting means for holddowns for pulleys, such drawings and description showing and describing, however, only two of the various forms in which said principle may be embodied.

Figure 1:
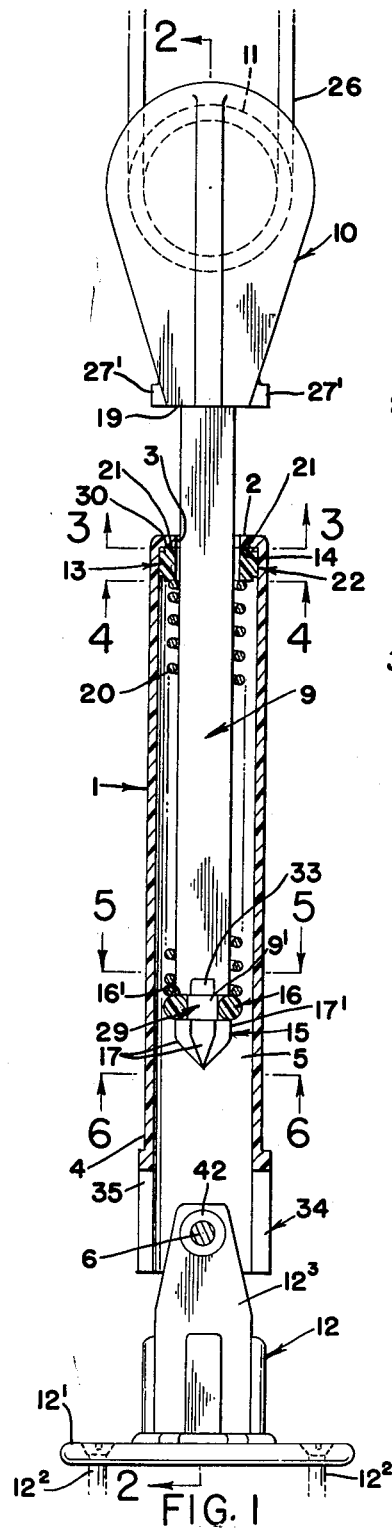
FIGURE 1 is a front elevation, partially in axial section, of the improved adjusting means, the view showing the holddown in a manually obtained spring-resisting elevated position for pulley adjustment, the view being taken from the planes indicated by the line 1—1, FIGURE 2.
Figure 7:
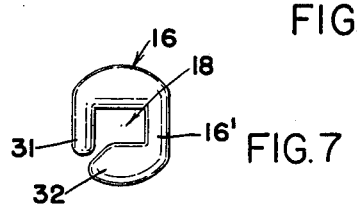
Figure 8:
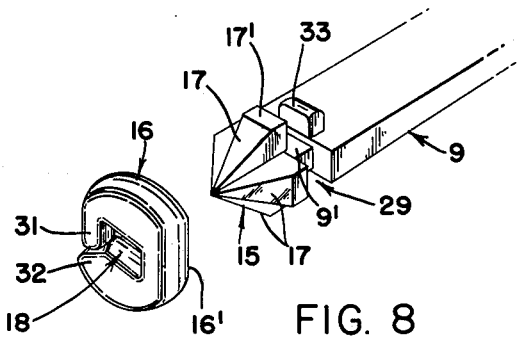
Figure 9:
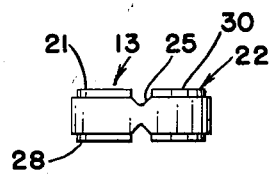
Figure 10:
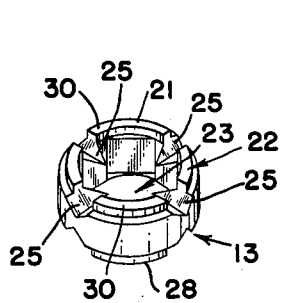
Figure 13:
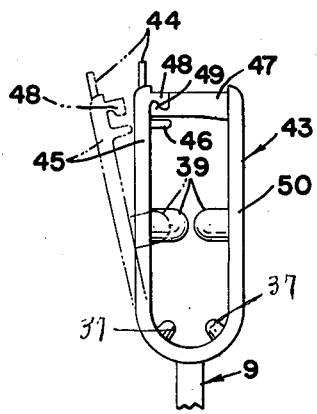
Figure 11:
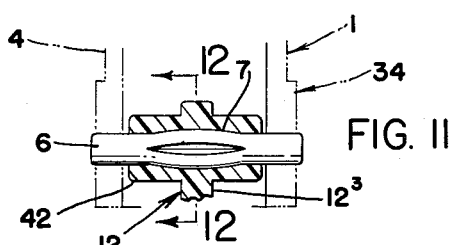
Figure 12:
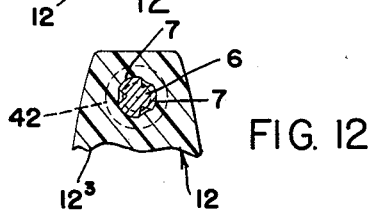

FIGURES 3, 4, 5, and 6 are cross-sections taken, respectively, in the planes indicated by the lines 3—3, 4—4, 5—5, and 6—6, FIGURE 1;

FIGURE 7 is a top plan view of an expansible locking washer designed to be mounted around and adjacent the bottom end of a pulley-mounting rod and forming a base for the lower end of a spring element;

FIGURE 8 is an exploded perspective of the expansible locking washer and the lower end of the pulley-mounting rod, the latter being formed with a peripheral groove into which the expansible locking washer can be forced over a lowermost bottom terminal portion of the rod;

FIGURE 9 is a side view of the rotatable clutch washer through which the pulley-mounting rod is axially movable, which rod and clutch washer are angularly movable as a unit, when the washer is released from a slip clutched position;

FIGURE 10 is a top perspective view of the clutch washer;

FIGURE 11 is an enlarged detail view of a pin forming a pivot in a support member;

FIGURE 12 is a section taken in the plane indicated by the line 12—12, FIGURE 11; and FIGURE 13 is a side view of a modified form of pulley housing within which the pulley for the drapery cord is rotatably mounted.

Referring to the annexed drawings in which the different elements of the adjusting means are designated by the same respective numerals in the several views, an elongated tubular housing 1 circular in cross-section has an upper end-wall member 2 formed with a circular hole 3 through which an elongated rectangular pulley-mounting rod 9 is freely longitudinally slideable, in any angular position thereof, for lifting a cord pulley 11 against the tension of a spring 20 which tends to hold the bottom end 19 of a pulley housing 10 mounted on the top of the rod 9 down on and flush with the exterior surface of the rod housing wall end-member 2.

A clutch washer or nut 13, FIGURE 10, when released from a slip clutch 24—25, hereinafter fully described, is freely rotatable in the housing 1 by and with the pulley-mounting rod 9, the upper face 21 of the washer 13 sliding on the inner face 14 of the housing end-member 2, the washer 13 being held against the end-member face 14 by the spring 20.

Referring particularly to FIGURES 3, 4, 9, and 10, the clutch washer 13 is a tubular body 22 having a cross-slot 23 formed therethrough from its upper face 21 to its lower face 28. This through cross-slot 23 forms 4 washer wall portions 30 at 90 degrees spacing. The washer 13 is formed in its upper face with four notches 25, also at ninety degrees spacing, extending from the corners of the slot 23 to the outer surface of the washer 13, which notches 25 are engageable with four complementary ribs 24 formed on the inner face 14 of the housing end member 2. The elements 24 on the face 14 of end member 2 and 25 on the upper face of washer 13 act as a slip clutch when the rod 9, and with it the washer 13, are angularly turned 90 degrees in the housing 1. The engagement of the ribs 24 and the notches 25 produces a clicking sound, and thus indicates a quarter position to which the rod 9 has been turned and with it the clutch washer 13. The rod 9 is then in engagement with one of the wall portions 30 of the cross-slot 23, and the washer 13 is releasably clutched. The clutching action of members 24 and 25 is overcome by the next turning of the rod 9 which turns the washer 13 with it.

The spring 20 encircles the rod 9 below the washer 13 and is based at its other and lower end on the upper face 16' of an expansible locking washer 16 positioned in a groove 29 formed within the lower end portion of the rod 9 around a rib 9' thereof of reduced dimensions, FIGURE 8.

Figure 2:
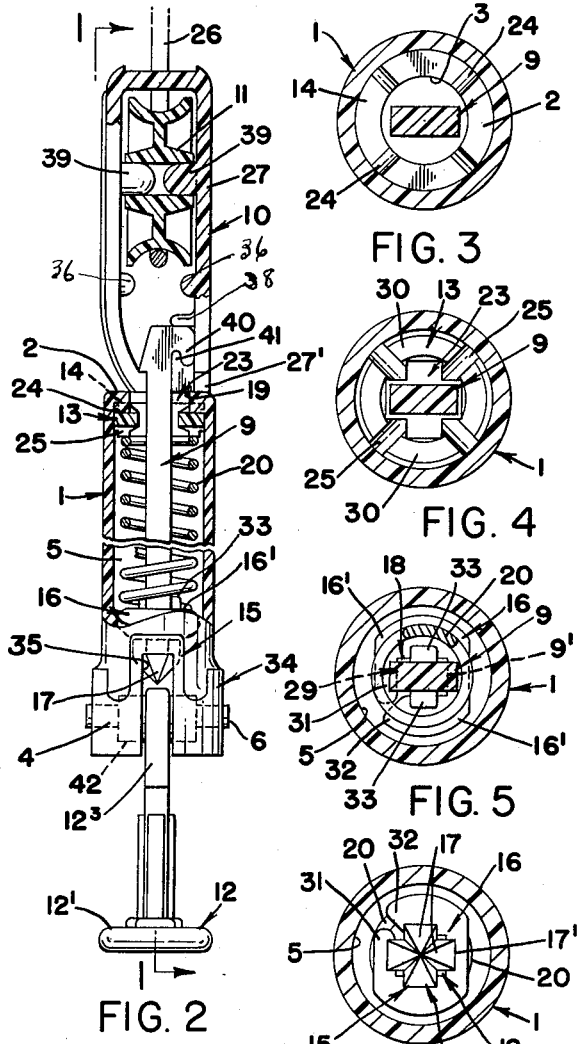
FIGURE 2 is a broken axial section, partially in side elevation, of the holddown in its lowermost and operative position, which position is induced by spring expansion.
Figure 3:
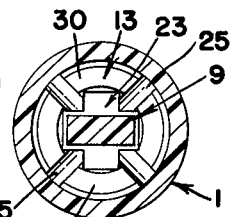
Figure 4:
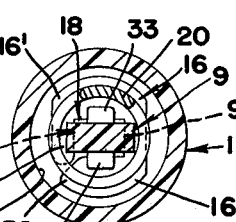
Figure 5:
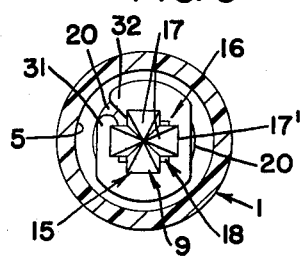
Figure 6:
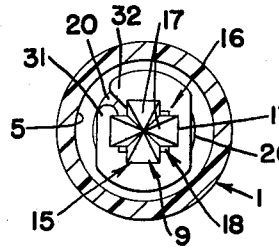

Depending in a cylindrical opening 5 formed by a lower end portion 4 of the housing 1, FIGURE 2, is a fluted formation 15, FIGURE 8, forming the bottom end of the pulley rod 9 below the rib 9'. A strengthened extreme lower end formation 34 of the housing 1 is formed by a tubular block molded to the outside surface of the housing end portion 4 and formed with opposed elongated slots 35 intersecting the opening 5, which slots 35 extend through the lower portion 4 of the housing 1, the slots 35 permitting the pivotal movement of the housing 1 on a journal pin 6, FIGURES 11 and 12, all as hereinafter more fully described.

Secured in a hub portion 42 of the support member 12 is the journal pin 6, FIGURES 11 and 12, upon the ends of which the holddown is journalled so it can be adjusted longitudinally of the cord pulley 11, FIGURE 1, the journal pin 6 intersecting an upstanding central member 12³ of a support member 12 to which member 12³ journal pin 6 is secured by splines 7, a base member 12¹ of the support being fastenable by screws 12² to a base board, wall or other suitable main support.

The fluted lower end portion 15 of the rod 9, which, in the fully expanded condition of the spring 20, FIGURE 2, depends into the lower part 4 of the housing 1, has upwardly converging sides 17, FIGURE 8, and upper end vertical faces 17' defining a perimeter greater than that of the upper adjacent rod portion and, within the confines of the faces 17' and above the latter, the rib 9' of the rod 9 is contained, thus forming the exterior groove 29 for reception of the expansible locking washer 16. Lugs 33, FIGURE 8, outwardly projecting from the front and rear faces of the rod 9, above the groove 29, FIGURES 1 and 8, form stops to prevent the expansible locking washer 16 from being forced upwardly on the rod 9 beyond the groove 29.

The locking washer 16, FIGURES 7 and 8, is a split expansible tubular member having a central opening 18 therethrough of a size sufficient to pass over the sides 17 of the fluted bottom end member 15 and the end faces 17' thereof when the locking washer 16 is expanded. The washer 16 slideably takes the apex portion 17 of the fluted bottom end 15 of the rod 9 but its opening 18, in unexpanded condition of the washer 16, is smaller than the opening defined by the end faces 17' of the sloping sides 17. The separated ends 31 and 32 of the washer 16 are temporarily spread far enough apart, when the washer is expanded under pressure applied thereto, to permit the washer opening 18 to be passed over the area defined by the end faces 17', after which, upon release of hte expanding pressure applied to the washer 16, the latter engages the groove 29 formed around the rib 9' of the rod 9.

The pulley housing 10 can be opened for threading of the pulley cable 26 by means of a resilient integral face member 27. The housing 10 is formed with a molded trunnion upon which the pulley 11 is rotatably mounted, the drawing showing a pair of opposed spaced inwardly projecting molded trunnions 39 serving as an axle. The top end of the rod 9 is formed with a locking member 40 that engages a locking member 41 formed integral with the resilient face member 27. A resilient flap 38 forced on the inside face of the member 27 serves to hold the members 40 and 41 in securely locked condition. The lower end of the face member 27 has formed thereon finger-pull tabs 27' to aid in assembly of the cable 26. Adjacently below the pulley 11 is a pair of teats 36 inwardly extended from the face members of the housing 10 and serving to prevent the pulley cord 26 from becoming jammed between the pulley 11 and said face memebrs.

The modified form 43 of pulley housing, FIGURE 13, has a springable front member 45 formed with an actuating finger pull 44, and interlocking members 48 and 49 on the face member 45 and a top cross member 47. Inwardly-extended opposed and spaced trunnions 39 for rotatably mounting a pulley wheel are formed on the face member 45 and a rear side housing member 50. An inwardly-extending locking flap 46 for the movable front member 45 and the top cross member 47 is formed on the face member 45 below its locking member 48. The pulley housing of FIGURE 13 is formed with an opposed pair of cord-jamming protection teats 37.

The manipulation of the improved adjusting means for a pulley holddown is as follows:

With the base 12 angularly fastened to the base board, wall or other suitable main support so as to align the upstanding member 12³ parallel to the desired traversing travel of the drapery, and the bottom end 19 of the pulley housing 10 abutting the exterior face of the housing end member 2, the ends of the operating cord 26 are tied together or the cord 26 otherwise regulated in length so to train on the pulley 11 at the desired height and angular location of the latter and place a slight tension on the cord 26. Then the rod 9, which is its lower position and in one of the slots of the cross-slot 23, is manually pulled upwardly against the tension of the spring 20 to the desired pulley heighth. Then the face member 27 of the pulley housing 10 is pulled open, and the cord 26 passed over the pulley 11. Then a turning force applied to the rod effects a release of the slip clutch 24—25, and the turning of the rod 9 and the washer 13. This turning of the rod 9 and washer 13 is 90 degrees the end of which is indicated by the clicking sound made by the next engagement of the slip clutch elements 24—25. Then manual release of the rod 9 results in the retraction of the latter under the expansion of the spring 20 so that the bottom end 19 of the pulley housing 10 rests on the housing end member 2, FIGURE 2, with the pulley 11 in the desired operating position, and the pulley 11 and, consequently, the cord 26 under slight tension.

I claim:

1. Adjusting means for holddowns for pulleys of drapery operating cords comprising, an elongated tubular housing with an inwardly-turned apertured upper end portion, a pulley-mounting rod rectangular in cross-section within and angularly turnable in the housing, lengthwise movable in the latter, and protruding at its upper end from the housing through the apertured upper end portion thereof, a cord-pulley mounted on the protruding end of the rod, a separate clutch washer within the housing, turnable therein by pressure applied to the rod, and having an upper surface portion slidable, when turned, on the inner surface of the inwardly-turned upper end portion of the housing, the clutch washer being formed with spaced slots therethrough, through selective opposed pairs of which slots the rod extends, the body of the clutch washer engaging the rod and preventing angular turning of the latter relative to the washer, a coil spring in the housing and based at its two ends, respectively, on the lower surface of the clutch washer and on a bottom portion of the rod, the spring being tensioned to hold the rod in its innermost position in the housing, and to hold the clutch washer against the inwardly-turned upper end portion of the housing, spaced releasable sets of opposed slip clutch members on the abutting faces of the washer and the inwardly-turned upper end portion of the housing, the respective sets of slip clutch members holding the clutch washer and the rod against angular turning movements except when sufficient turning pressure is applied to the rod to overcome the clutching action between the washer and the upper end portion of the housing, the adjusting means further comprising a base member securable to a main support, the housing being pivotally mounted on the base member.

2. Adjusting means for holddowns for pulleys of drapery operating cords, characterized as in claim 1, in which an exterior groove is formed in the rod adjacent its bottom end, in which the terminal lower end of the rod below the groove has a downwardly tapering exterior surface with a top wall defining a perimeter greater than that of the upper adjacent rod portion, and in which a compressible washer having a wall opening leading to an aperture in the washer having a perimeter smaller than that of said top wall is forced over the terminal lower end of the rod and into the groove to form the bottom portion of the rod upon which the lower end of the spring is based.

3. Adjusting means for holddowns for pulleys of drapery operating cords comprising, an elongated tubular housing with an apertured upper end wall, a pulley-mounting rod rectangular in cross-section within and angularly turnable in the housing, lengthwise movable in the latter, and protruding at its upper end from the housing through the apertured upper end wall thereof, a cord-pulley mounted on the protruding end of the rod, a separate clutch washer within the housing, turnable therein by pressure applied to the rod, and having an upper face adjacent the inner face of the upper end wall of the housing, the clutch washer being formed with a cross-slot therethrough, through opposed portions of which cross-slot the rod extends, the side walls of the cross-slot engaging the rod to prevent angular turning of the latter relative to the washer, the rod having a tapering bottom end portion, an expansible apertured locking washer encircling the bottom end portion of the rod, the inside dimension of the locking washer in unexpanded condition being smaller than that of the bottom end portion of the rod, spring means surrounding the rod, based at its two ends, respectively, on the expansible locking washer and on the bottom face of the clutch washer, the spring means being tensioned to hold the rod normally in an innermost position in the housing, and to hold the clutch washer against the inside face of the upper end wall of the housing, spaced releasable sets of opposed slip clutch members on the adjacent faces of the clutch washer and the upper end wall of the housing, the respective sets of slip clutch members holding the clutch washer and the rod against angular turning movement except when sufficient turning pressure is applied by the rod to the side walls of the cross-slot to overcome the clutching action between the adjacent faces of the washer and the upper end wall of the housing, the adjusting means further comprising a base member securable to a main support, the housing being pivotally mounted on the base member.

4. A pulley hold-down for traverse rod installations comprising an elongated hollow housing, a base secured to one end of said housing for fastening said housing to a support, a pulley rod slidably received in said housing and having a portion extending outwardly therefrom at the opposite end from said base portion, a pulley housing carried by the outwardly extending end of said rod and movable therewith, a pulley rotatably mounted in said pulley housing for receiving a drapery operating cord, indexing means for rotatively adjusting said rod, pulley housing and pulley in relation to said hollow housing from one position to another including a nut slidably received in said housing for longitudinal movement therein, said nut being slidably mounted on said rod, spring means received in said housing for resiliently urging the rod, pulley housing and pulley in one direction and said nut in the opposite direction, and interlocking slip clutch means influenced by said spring, including cam surfaces on said housing and nut, for normally holding the rod, pulley housing and pulley in a selected indexed position.

References Cited in the file of this patent

UNITED STATES PATENTS

| | | |
|---|---|---|
| 1,083,986 | Burns | Jan. 13, 1914 |
| 2,555,059 | Schrader | May 29, 1951 |
| 2,830,808 | Graber | Apr. 15, 1958 |

FOREIGN PATENTS

| | | |
|---|---|---|
| 326,858 | Germany | Oct. 4, 1920 |